United States Patent
Kawakami et al.

(10) Patent No.: US 10,389,073 B2
(45) Date of Patent: Aug. 20, 2019

(54) BRANCH CONNECTOR FOR VEHICLE WIRE HARNESSES AND ROUTING STRUCTURE FOR VEHICLE WIRE HARNESSES

(71) Applicants: YAZAKI CORPORATION, Tokyo (JP); TOYOTA JIDOSHA KABUSHIKI KAISHA, Toyota-shi, Aichi (JP)

(72) Inventors: Hiroki Kawakami, Okazaki (JP); Shinji Oshita, Toyota (JP); Hideomi Adachi, Shizuoka (JP); Masahide Tsuru, Shizuoka (JP)

(73) Assignees: YAZAKI CORPORATION, Minato-ku, Tokyo (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 16/213,410

(22) Filed: Dec. 7, 2018

(65) Prior Publication Data
US 2019/0181600 A1    Jun. 13, 2019

(30) Foreign Application Priority Data
Dec. 8, 2017   (JP) ................. 2017-235770

(51) Int. Cl.
| | |
|---|---|
| *H01R 11/00* | (2006.01) |
| *H01R 31/02* | (2006.01) |
| *B60R 16/02* | (2006.01) |
| *H01R 13/68* | (2011.01) |
| *B60K 6/22* | (2007.10) |

(52) U.S. Cl.
CPC ......... *H01R 31/02* (2013.01); *B60R 16/0207* (2013.01); *H01R 13/68* (2013.01); *B60K 6/22* (2013.01); *B60Y 2200/91* (2013.01); *B60Y 2200/92* (2013.01); *H01R 2201/26* (2013.01)

(58) Field of Classification Search
CPC .... H01R 31/02; H01R 13/68; H01R 2201/26; B60R 16/0207; B60K 6/22; B60Y 2200/91
USPC .................................... 439/502–505
See application file for complete search history.

(56) References Cited

U.S. PATENT DOCUMENTS 9,771,037 B2 *   9/2017   Kugelstadt ............ B60K 6/405
2016/0229293 A1   8/2016   Seo et al.

FOREIGN PATENT DOCUMENTS

JP         2015-061414 A        3/2015

\* cited by examiner

*Primary Examiner* — Khiem M Nguyen
(74) *Attorney, Agent, or Firm* — Sughrue Mion, PLLC

(57) ABSTRACT

A branch connector for vehicle wire harnesses is connected to an inverter that is connected to a battery and configured to distribute electric power. The branch connector for vehicle wire harnesses is integrally connected to a first device, which is one of a plurality of devices and is positioned upstream closer to the inverter, and is electrically connected to a second device, which is one of the plurality of devices and is positioned downstream, via a harness. The branch connector for vehicle wire harnesses can distribute electric power from the inverter to each of the devices.

2 Claims, 3 Drawing Sheets

BRANCH CONNECTOR FOR VEHICLE WIRE HARNESSES AND ROUTING STRUCTURE FOR VEHICLE WIRE HARNESSES

BACKGROUND

Technical Field

The present invention relates to a branch connector for vehicle wire harnesses and a routing structure for vehicle wire harnesses, to be used for, for example, an electric vehicle (EV) and a hybrid electric vehicle (HEV).

Related Art

For example, an electric-powered vehicle disclosed in JP 2015-61414 A is known as an electric-powered vehicle that distributes electric power of a battery to a plurality of devices. The electric-powered vehicle includes a repeater that distributes electric power of the battery to a front inverter (device) and a rear inverter (device).

SUMMARY

However, in the conventional structure for distributing electric power of a battery to a plurality of devices, a repeater (branch box) is provided outside each device, independently of each device. It is thus necessary to install the repeater somewhere separately. Therefore, depending on requirements of a vehicle, the installation location thereof is limited. Furthermore, a long wire harness is necessary depending on the installation location thereof.

Accordingly, the present invention has been made to solve the above-described problems. An object of the present invention is to provide a branch connector for vehicle wire harnesses and a routing structure for vehicle wire harnesses, which need no separate installation of a branch box and can achieve space saving and weight saving of a wire harness.

According to a first aspect of the present invention, there is provided a branch connector for vehicle wire harnesses, to be connected to an inverter that is connected to a battery and configured to distribute electric power, the branch connector being integrally connected to one of a plurality of devices, which is positioned upstream closer to the inverter, and being connected to one of the plurality of devices, which is positioned downstream, via a harness, the branch connector including: a connector body to be integrally connected to a first device positioned upstream closer to the inverter; a connector with a fuse, attached to the inverter; a first harness that connects the connector body and the connector with a fuse; and a second harness that connects the connector body and a second device positioned downstream the connector body, the second harness being formed to have the same cable size as that of the first harness, wherein the branch connector for vehicle wire harnesses is configured such that electric power from the inverter can be distributed to the plurality of devices.

Furthermore, according to a second aspect of the present invention, there is provided a routing structure for vehicle wire harnesses to be routed between an inverter, which converts direct-current power output from a battery to alternating-current power, and a plurality of devices to which the alternating-current power is supplied from the battery via the inverter, the routing structure including: a connector with a fuse, attached to the inverter; a branch connector for power distribution, attached to a first device positioned upstream closer to the inverter; a harness connecting connector attached to a second device positioned downstream distant from the inverter; a first harness that connects the connector with a fuse and the branch connector; and a second harness that connects the branch connector and the second device, the second harness being formed to have the same cable size as that of the first harness.

With the above-described configuration, in which a function of distributing electric power is provided in the connector, it is not necessary to separately install a branch box, and it is possible to achieve space saving and weight saving of a wire harness.

DETAILED DESCRIPTION

An embodiment of the present invention will be described below with reference to the drawings.

Figure 1:
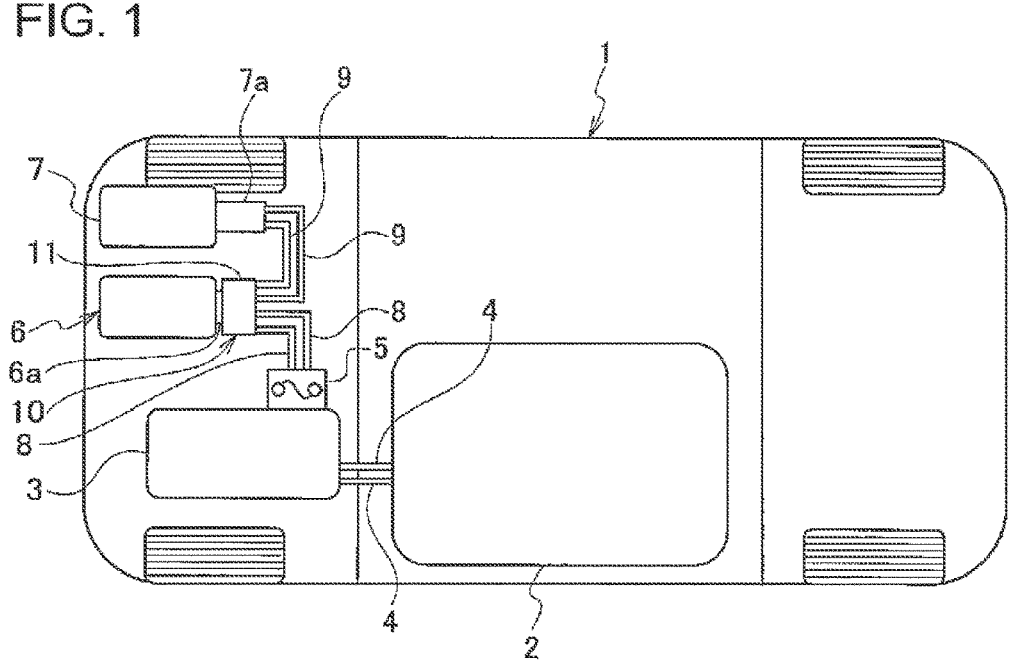
FIG. 1 is a schematic view schematically illustrating a power distribution structure of a branch connector for vehicle wire harnesses according to an embodiment of the present invention.

As illustrated in FIG. 1, a branch connector 10 for vehicle wire harnesses is used for, for example, an electric-powered vehicle (vehicle) 1 such as an electric vehicle (EV) and a hybrid electric vehicle (HEV). The branch connector 10 for vehicle wire harnesses distributes electric power from a battery (high-voltage power supply) 2 to a first device (a device positioned upstream, closer to an inverter 3) 6 and a second device (a device positioned downstream) 7, via the inverter 3 that converts direct-current power output from the battery 2 to alternating-current power. A connector body 11 of the branch connector 10 for vehicle wire harnesses has a function of distributing electric power, and is connected to the inverter 3, which is connected to the battery 2 and distributes alternating-current power, via a pair of harnesses 8 and 8. The connector body 11 is integrally connected to the first device 6, and is connected, via a pair of harnesses 9 and 9, to a harness connecting connector 7a attached to the second device 7. The connector body 11 distributes alternating-current power from the inverter 3 to the first device 6 and the second device 7.

Figure 3:
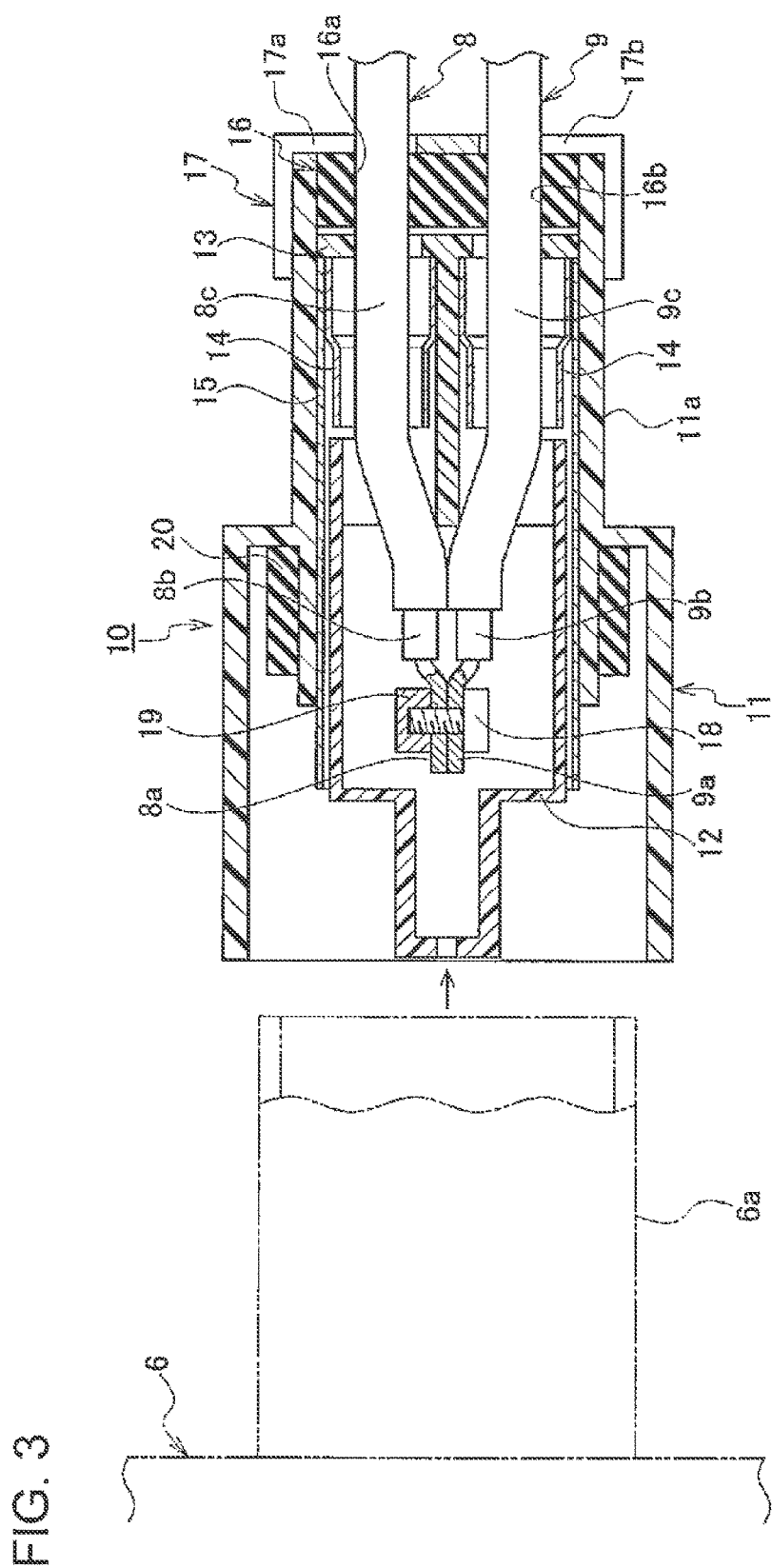
FIG. 3 is a cross-sectional view taken along the line X-X in FIG. 2.

In addition, as illustrated in FIG. 1, the battery 2 and the inverter 3 are connected by a pair of short harnesses 4 and 4. Furthermore, a connector 5 with a fuse is attached to the inverter 3. The pair of harnesses 8 and 8 connecting the connector 5 with a fuse and the connector body 11 and the pair of harnesses 9 and 9 connecting the connector body 11 and the connector part 7a of the second device 7 are formed to have the same cable size, that is, formed in the same thickness and the same length. Moreover, as illustrated in FIG. 3, the harnesses 8 and 9 are shielded cables that include conductors 8a and 9a, insulators 8b and 9b, and insulating sheaths 8c and 9c as outer covers for covering braided wires (not illustrated), respectively. In addition, the harnesses 8 and 9 each have noise shielding performance for shielding electromagnetic noise as countermeasures against electromagnetic waves.

Figure 2:
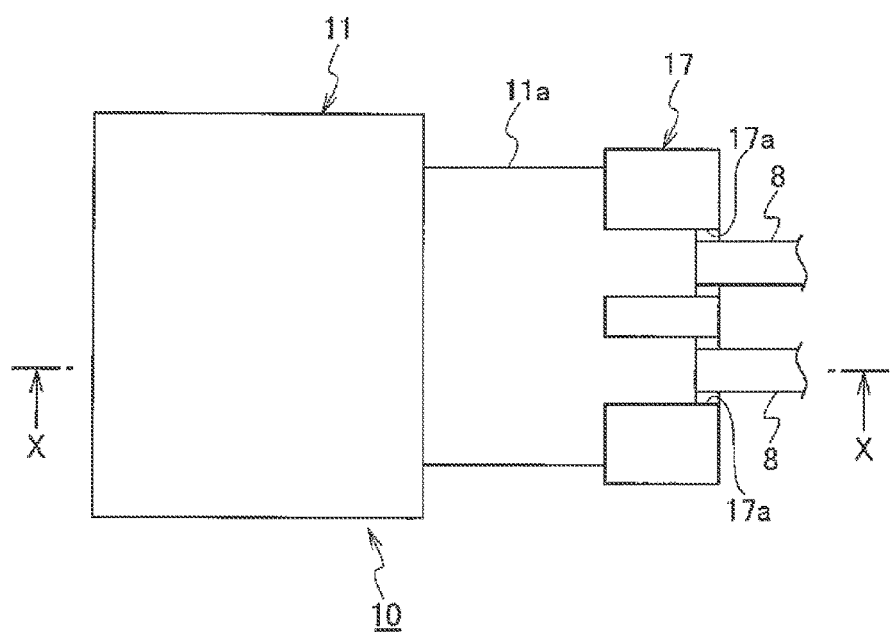
FIG. 2 is a top view of the branch connector for vehicle wire harnesses.

As illustrated in FIGS. 2 and 3, the connector body 11 of the branch connector 10, which is integrally connected to the first device 6, is made of synthetic resin and formed in a rectangular box shape. The connector body 11 includes a hood part 11a in a quadrangular cylindrical shape. The hood part 11a is formed, as a protrusion from a front wall, integrally with the inside of the front wall. In the hood part 11a in a quadrangular cylindrical shape, the pair of harnesses 8 and 8 extending from the inverter 3 and the pair of harnesses 9 and 9 extending from the second device 7 are arranged on an upper stage and a lower stage, respectively, through a partition member 12 constituting a circuit connecting part, a dividing member 13 made of synthetic resin, a sealing member 16 such as rubber packing, and a cover 17 made of synthetic resin for holding the sealing member 16.

The harnesses 8 and 9 are inserted into the hood part 11a through cable through holes 16a and 16b, respectively, and are housed in the hood part 11a. The cable through holes 16a and 16b are formed in the rubber sealing member 16. The harnesses 8 and 9 in the dividing member 13 are covered with their respective shield shells 14 in a substantially cylindrical shape. Furthermore, both shield shells 14 are covered with a shield shell 15 in a cylindrical shape. In addition, u-shaped slits 17a and 17b through which the harnesses 8 and 9 are inserted, respectively, are formed in an upper part and a lower part of the cover 17.

Moreover, as illustrated in FIG. 3, the conductors 8a and 9a exposed from the insulators 8b and 9b, respectively, on the respective ends of the harness 8 extending from the inverter 3 and the harness 9 extending from the second device 7 are connected with each other, with a bolt 18 and a nut 19.

Furthermore, an electric connection part 6a of the first device 6 is configured to be fitted in the hood part 11a of the connector body 11 of the branch connector 10 in such a manner that the electric connection part 6a can be fitted therein and detached therefrom freely. When being fitted therein, the electric connection part 6a is sealed therein with a sealing member 20, such as rubber packing, fitted to an outer circumference of the hood part 11a positioned in the connector body 11, so that waterproof performance is achieved. The electric connection part 6a has a male terminal (not illustrated), and the conductors 8a and 9a are connected to a female terminal (not illustrated). As a result of these male and female terminals mating with each other, the harnesses 8 and 9 are electrically connected to the first device 6.

Figure 4:
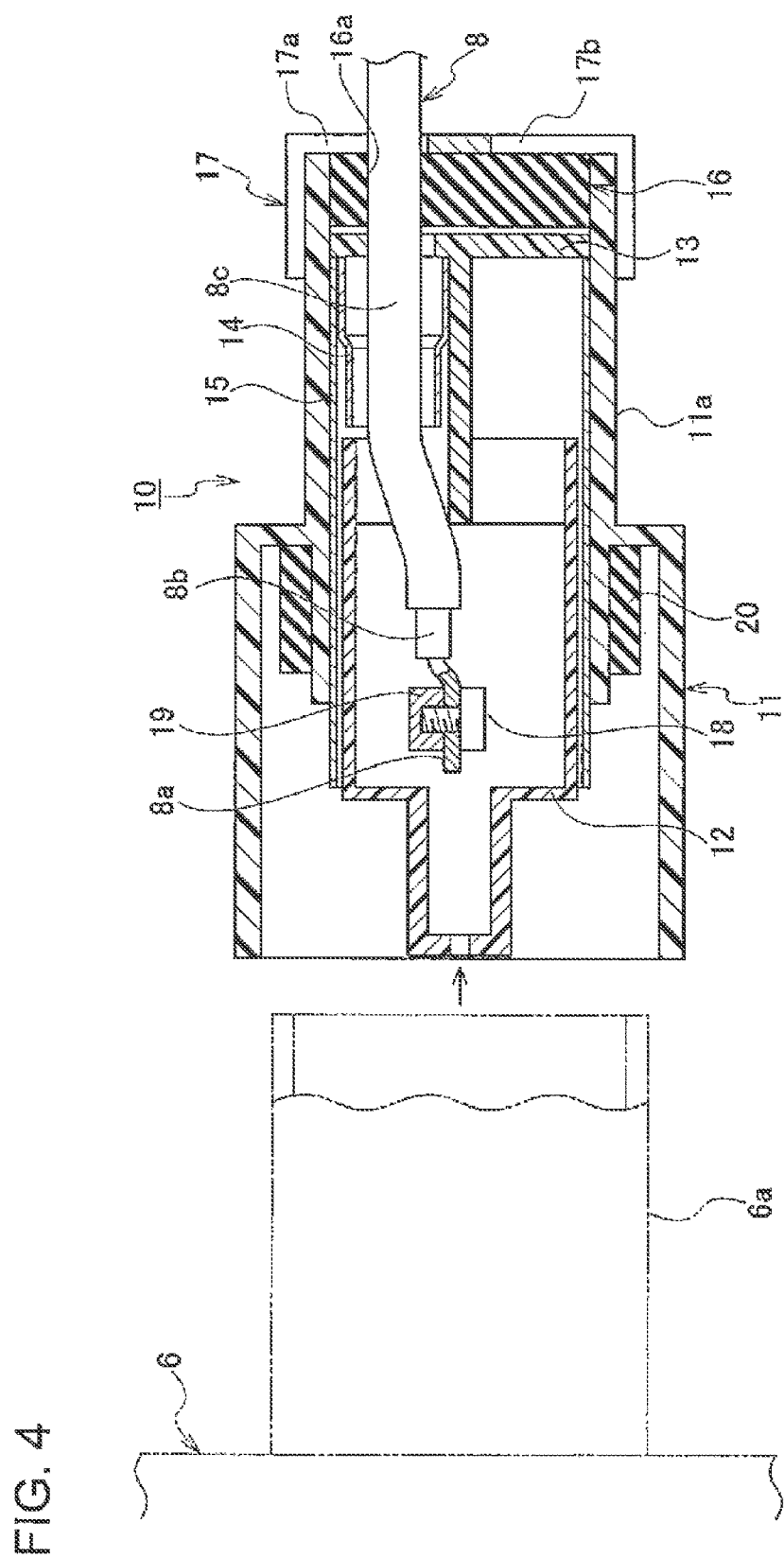
FIG. 4 is a cross-sectional view of the branch connector for vehicle wire harnesses in the case where electric power is not distributed to a second device by the branch connector for vehicle wire harnesses.

Furthermore, in the case where alternating-current power from the inverter 3 is not distributed to the second device 7, there is sealed the cable through hole 16b as illustrated in FIG. 4, through which the harness 9 is to penetrate, the cable through hole 16b being formed in the lower stage of the sealing member 16 of the branch connector 10.

In the branch connector 10 for vehicle wire harnesses of the embodiment described above, the function of distributing alternating-current power from the inverter 3 is provided in the connector body 11. Accordingly, it is not necessary to separately install a branch box, and it is thus possible to achieve space saving.

In addition, the length of a wire harness conventionally routed up to a branch box is reduced, and the weight of a wire harness to be used can be reduced accordingly. Thus, it is possible to achieve weight saving and cost reduction of a wire harness.

Furthermore, the pair of harnesses 8 and 8 connecting the connector body 11 of the branch connector 10 and the connector 5 with a fuse, attached to the inverter 3, and the pair of harnesses 9 and 9 connecting the connector body 11 and the second device 7 positioned downstream are formed to have the same cable size, that is, formed in the same thickness and the same length. As a result, cable protection is not necessary for the harness 9 positioned downstream, and it is possible to dispense with a fuse. Thus, cost reduction can be achieved accordingly.

It should be noted that in the above-described embodiment, alternating-current power from the inverter is distributed by the branch connector to the two devices, that is, the first and second devices. However, alternating-current power may be distributed to three or more devices.

What is claimed is:

1. A branch connector for vehicle wire harnesses, to be connected to an inverter that is connected to a battery and configured to distribute electric power, the branch connector being integrally connected to one of a plurality of devices, which is positioned upstream closer to the inverter, and being connected to one of the plurality of devices, which is positioned downstream, via a harness, the branch connector comprising:
    a connector body to be integrally connected to a first device positioned upstream closer to the inverter;
    a connector with a fuse, attached to the inverter;
    a first harness that connects the connector body and the connector with a fuse; and
    a second harness that connects the connector body and a second device positioned downstream from the connector body, the second harness being formed to have a same cable size as that of the first harness,
    wherein the branch connector for vehicle wire harnesses is configured such that electric power from the inverter can be distributed to the plurality of devices.

2. A routing structure for vehicle wire harnesses to be routed between an inverter, which converts direct-current power output from a battery to alternating-current power, and a plurality of devices to which the alternating-current power is supplied from the battery via the inverter, the routing structure comprising:
    a connector with a fuse, attached to the inverter;
    a branch connector for power distribution, attached to a first device positioned upstream closer to the inverter;
    a harness connecting connector attached to a second device positioned downstream distant from the inverter;
    a first harness that connects the connector with a fuse and the branch connector; and
    a second harness that connects the branch connector and the second device, the second harness being formed to have a same cable size as that of the first harness.

* * * * *